(12) United States Patent
Watanabe et al.

(10) Patent No.: US 6,970,782 B2
(45) Date of Patent: Nov. 29, 2005

(54) SYSTEM FOR UPDATING NAVIGATION INFORMATION AND APPARATUS FOR DISTRIBUTING UPDATED NAVIGATION INFORMATION

(75) Inventors: Tomo Watanabe, Tsurugashima (JP); Keiichi Yamauchi, Tsurugashima (JP)

(73) Assignee: Pioneer Corporation, Tokyo-to (JP)

( * ) Notice: Subject to any disclaimer, the term of this patent is extended or adjusted under 35 U.S.C. 154(b) by 6 days.

(21) Appl. No.: 10/015,895

(22) Filed: Dec. 17, 2001

(65) Prior Publication Data
US 2002/0087261 A1    Jul. 4, 2002

(30) Foreign Application Priority Data
Dec. 28, 2000   (JP)  ............................ P2000-402108

(51) Int. Cl.$^7$ ........................ G01C 21/34; G01C 21/00
(52) U.S. Cl. ...................... 701/200; 701/208; 701/209; 73/178 R; 340/991; 705/500; 705/50
(58) Field of Search ................................ 701/200, 207, 701/208, 209, 211; 73/178 R; 340/988, 991; 705/16, 18, 26, 500, 50

(56) References Cited

U.S. PATENT DOCUMENTS

| | | | |
|---|---|---|---|
| 5,680,306 A * | 10/1997 | Shin et al. .................. 180/167 |
| 5,880,958 A * | 3/1999 | Helms et al. ............... 701/117 |
| 5,928,306 A * | 7/1999 | France et al. ............... 701/207 |
| 6,204,808 B1 * | 3/2001 | Bloebaum et al. ...... 342/357.07 |
| 6,314,369 B1 * | 11/2001 | Ito et al. ..................... 701/209 |
| 6,339,745 B1 * | 1/2002 | Novik ........................ 701/208 |
| 6,360,167 B1 * | 3/2002 | Millington et al. ......... 701/211 |
| 6,532,417 B2 * | 3/2003 | Hatano ....................... 701/207 |
| 2004/0066330 A1 * | 4/2004 | Knockeart et al. ...... 342/357.07 |

* cited by examiner

Primary Examiner—Olga Hernandez
(74) Attorney, Agent, or Firm—Morgan Lewis & Bockius LLP

(57) ABSTRACT

A navigation information updating system G updates navigation information for use in a navigation process executed by navigation apparatus S that navigate respective vehicles. The navigation information updating system G comprises: the navigation apparatus transmitting an identifier Sid associated therewith to an updating center UC; the updating center UC that outputs updated navigation information which is generated on the basis of the transmitted identifier Sid for each associated navigation apparatus S, to a shop SP; and the shop SP that delivers the outputted updated navigation information to the associated navigation apparatus S.

17 Claims, 8 Drawing Sheets

SYSTEM FOR UPDATING NAVIGATION INFORMATION AND APPARATUS FOR DISTRIBUTING UPDATED NAVIGATION INFORMATION

BACKGROUND OF THE INVENTION

1. Field of the Invention

The present invention relates generally to navigation information updating systems and navigation information distributing apparatuses, and particularly to a navigation information updating system and a navigation information distributing apparatus for frequently updating navigation information for navigation process that assists in moving a mobile unit such as vehicles, etc.

2. Description of Related Art

Navigation systems have become increasingly popular lately with their useful process of navigating mobile units such as vehicles, and to execute such navigation process, these systems use navigation information including information about road maps, intersections, landmarks, routing to destinations, etc.

The information about road maps, intersections, etc. included in the navigation information needs to be updated frequently (e.g., yearly) as new roads are constructed or new buildings are built.

However, to update the navigation information, users of the prior art navigation systems have no alternative but to replace the recording medium (on which the current navigation information is recorded) incorporated into those systems with a recording medium on which newly purchased updated navigation information is recorded, or to acquire updating navigation information, for example, via the Internet to replace the current navigation information using the acquired updating information.

SUMMARY OF THE INVENTION

It is therefore an object of the present invention to provide a new navigation information updating system that allows to update the navigation information effectively and simply.

The above object of the present invention can be achieved by a system for updating navigation information for navigation process executed by a navigation apparatus that assists in moving a mobile unit provided with: the navigation apparatus, having an identifier uniquely associated therewith and provided with a transmitting device for transmitting the identifier to an updating center module; the updating center module for generating updated navigation information corresponding to the navigation apparatus on the basis of transmitted identifier to output the generated updated navigation information to a delivery base; and the delivery base for delivering outputted updated navigation information to the navigation apparatus.

According to the present invention, the updated navigation information is generated on the basis of the identifier uniquely associated with the navigation system, and the generated updated navigation information is delivered to the associated navigation apparatus via the delivery base, for use by the associated user, whereby the navigation information can be updated for each associated navigation apparatus while used by the associated navigation apparatus, for delivery to the associated navigation apparatus.

In one aspect of the system for updating navigation information of the present invention, the navigation information is recorded on a rewritable recording medium.

According to this aspect, the navigation information is recorded on a rewritable recording medium, whereby the navigation information can be updated easily using the updated navigation information.

In another aspect of the system for updating navigation information of the present invention, the recording medium is associated with preset authenticating information, and the navigation apparatus further comprises a determining device for determining whether the identifier coincides with the authenticating information, and only when the determining device determines that the identifier coincides with the authenticating information, the navigation information recorded on the recording medium can be read.

According to this aspect, only when the identifier coincides with the authenticating information, the navigation information recorded on the recording medium can be read, whereby the reading of updated navigation information can be prevented unless such updated navigation information corresponds to each associated navigation apparatus.

In further aspect of the system for updating navigation information of the present invention, when generating the updated navigation information corresponding to the navigation apparatus on the basis of transmitted identifier, the updating center module associates the identifier with the updated navigation information as the authenticating information.

According to this aspect, when generating the updated navigation information corresponding to each navigation apparatus associated with the transmitted identifier, the updating center module associates the identifier with the updated navigation information as authenticating information, whereby the updated navigation information can be generated which is reliably corresponding to each navigation apparatus.

In further aspect of the system for updating navigation information of the present invention, the transmitting device further transmits an additional information additionally recorded on the recording medium based on an instruction given by a user, and the updating center module generates the updated navigation information on the basis of the identifier and transmitted additional information.

According to this aspect, the updating center module generates the updated navigation information on the basis of the identifier and the additional information, whereby updated navigation information can be generated which is better fit for each navigation apparatus.

In further aspect of the system for updating navigation information of the present invention, the updating center module generates the updated navigation information using at least one of history information indicative of a history of the navigation process executed by the navigation apparatus and preference information indicative of preferences shown by the navigation apparatus during execution of the navigation process.

According to this aspect, the updated navigation information can be generated without loss of such history and preference information as necessary for executing the navigation process in the future, whereby updated navigation information can be generated which is beneficial for future execution of the navigation process.

In further aspect of the system for updating navigation information of the present invention, the navigation apparatus transmits at least one of the history information and the preference information to the updating center module along with the identifier by the transmitting device.

According to this aspect, the history information and preference information generated during actual execution of the navigation process is transmitted and used to generate the updated navigation information, whereby more useful updated navigation information can be generated.

In further aspect of the system for updating navigation information of the present invention, the delivery base is a production base for producing the recording medium, the production base comprises: a recording module for recording the outputted updated navigation information on the recording medium; and a shipping module for shipping the recording medium having the updated navigation information recorded thereon to a user of the navigation apparatus within which the updated navigation information is used.

According to this aspect, the recording medium having the updated navigation information recorded thereon is shipped from the production base for delivery to each associated navigation apparatus, whereby the updated navigation information can be delivered to the associated navigation apparatus reliably.

In further aspect of the system for updating navigation information of the present invention, the delivery base is a production base for producing the recording medium, the production base comprises: a recording module for recording the outputted updated navigation information on the recording medium; an incorporating module for incorporating the recording medium having the updated navigation information recorded thereon into the navigation apparatus which is brought into the production base; and the updating center module further comprises a location transmitting device for transmitting location information about the delivery base to the navigation apparatus so that the navigation apparatus can be brought into the production base.

According to this aspect, each navigation apparatus is brought into the production base where the recording medium having the associated updated navigation information recorded thereon is produced, to have the recording medium incorporated there into, whereby the navigation information can be updated inexpensively.

In further aspect of the system for updating navigation information of the present invention, the delivery base is a sales base comprising: a recording module for recording the outputted updated navigation information on the recording medium; and a shipping module for shipping the recording medium having the updated navigation information recorded thereon to a user of the navigation apparatus within which the updated navigation information is used.

According to this aspect, the recording medium having the updated navigation information recorded thereon is shipped from the sales base for delivery to each associated navigation apparatus, whereby the updated navigation information can be delivered reliably and quickly.

In further aspect of the system for updating navigation information of the present invention, the transmitting device transmits a location of the navigation apparatus to the updating center module; and the updating center module further comprises: a returning device for returning an instruction information indicative of the delivery base which is close to the location of the navigation apparatus on the basis of the transmitted location, to the navigation apparatus, in order to bring the navigation apparatus into the delivery base which is close to the location of the navigation apparatus; and an outputting device for outputting the generated updated navigation information to the delivery base which is close to the location of the associated navigation apparatus; and the delivery base is a sales base for selling the recording medium, the sales base comprises: a recording module for recording the outputted updated navigation information on the recording medium; and an incorporating module for incorporating the recording medium having the updated navigation information recorded thereon into the navigation apparatus which is brought into the sales base.

According to this aspect, each navigation apparatus is brought into a nearby sales base to have the recording medium incorporated thereinto, whereby the navigation information can be updated inexpensively and quickly.

In further aspect of the system for updating navigation information of the present invention, the recording module is authenticated by the updating center module as an authorized recording module.

According to this aspect, the recording module installed in the sales base is authenticated by the updating center module as an authorized recording module, whereby the navigation information can be updated while preventing illegal acts such as illegal copying at the sales base.

The above object of the present invention can be achieved by an apparatus for distributing updated navigation information which is obtained by updating navigation information for navigation process executed by a navigation apparatus that assists in moving a mobile unit provided with: an acquiring device for acquiring an identifier uniquely associated with the navigation apparatus from the navigation apparatus; a generating device for generating the updated navigation information corresponding to the navigation apparatus on the basis of the acquired identifier; and an outputting device for outputting the updated navigation information to a delivery base for delivering the generated updated navigation information to the navigation apparatus.

According to the present invention, the updated navigation information is generated on the basis of the identifier uniquely associated with each navigation apparatus, and the generated updated navigation information is delivered to the associated navigation apparatus via a delivery base, for use by the associated user, whereby the navigation information can be updated for each associated navigation apparatus while used by the associated navigation apparatus, for delivery to the associated navigation apparatus.

In one aspect of the apparatus for distributing updated navigation information of the present invention, the generating device changes contents of the updated navigation information so as to correspond to contents of the acquired identifier, to generate the updated navigation information.

According to this aspect, the contents of the updated navigation information is changed so as to correspond to the contents of the acquired identifier to generate the updated navigation information, whereby updated navigation information can be generated which is better fit for each navigation apparatus.

In another aspect of the apparatus for distributing updated navigation information of the present invention, the generating device associates the acquired identifier with the updated navigation information to generate the updated navigation information.

According to this aspect, the acquired identifier is associated with the updated navigation information to generate the updated navigation information, whereby each navigation system can easily check whether the updated navigation information corresponds to itself or not after the updated navigation information has been delivered thereto.

In further aspect of the apparatus for distributing updated navigation information of the present invention, the apparatus further comprises an location information outputting device for outputting information about a location of the delivery base to the associated navigation apparatus.

According to this aspect, information about the location of the delivery base at which the updated navigation information is delivered is outputted to each navigation apparatus, whereby the mobile unit in which such navigation apparatus is installed can reach the delivery base easily.

DETAILED DESCRIPTION OF THE PREFERRED EMBODIMENTS

Preferred embodiments of the present invention will now be described below with reference to the drawings. These embodiments refer to the cases where the invention is applied to a system for updating navigation information for navigation process that assists in moving vehicles.

First Embodiment

Figure 1:
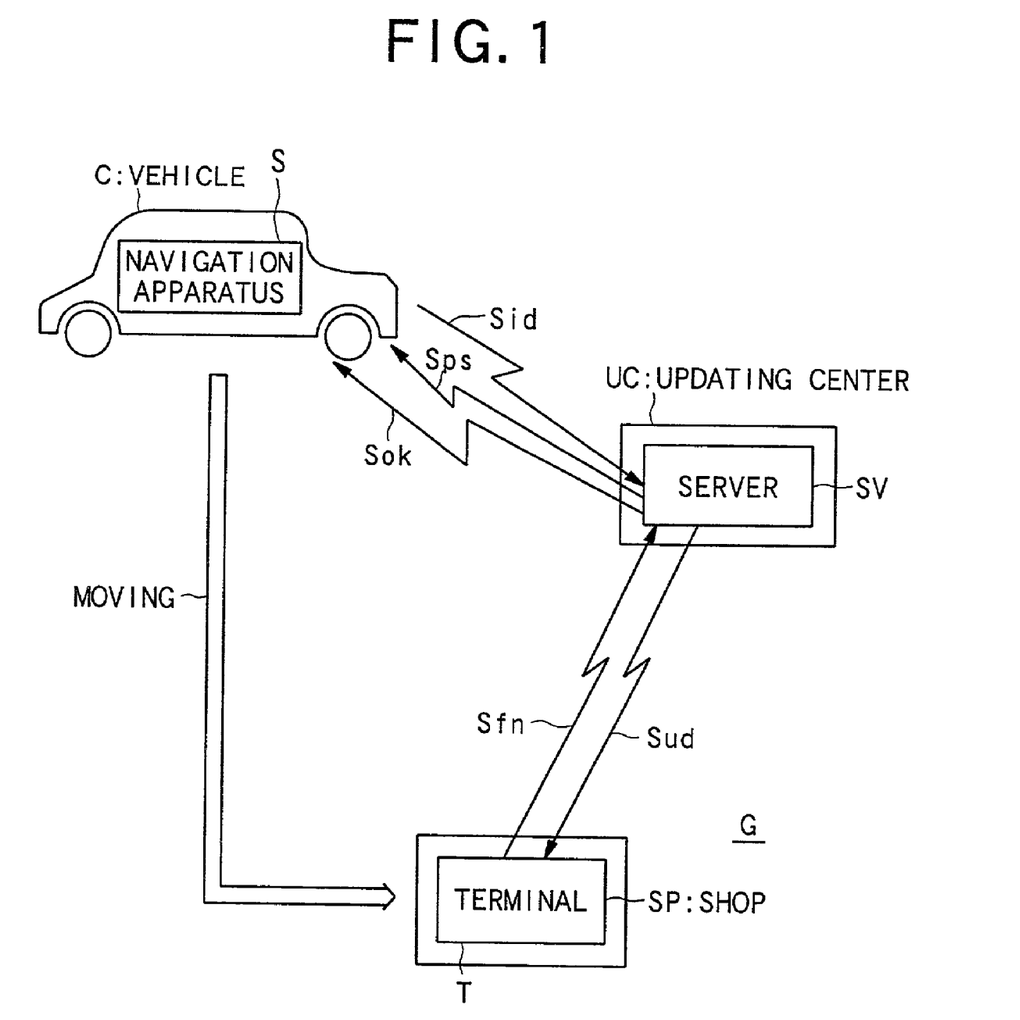
FIG. 1 is a block diagram showing an overview configuration of a navigation information updating system according to a first embodiment of the invention.
Figure 2:
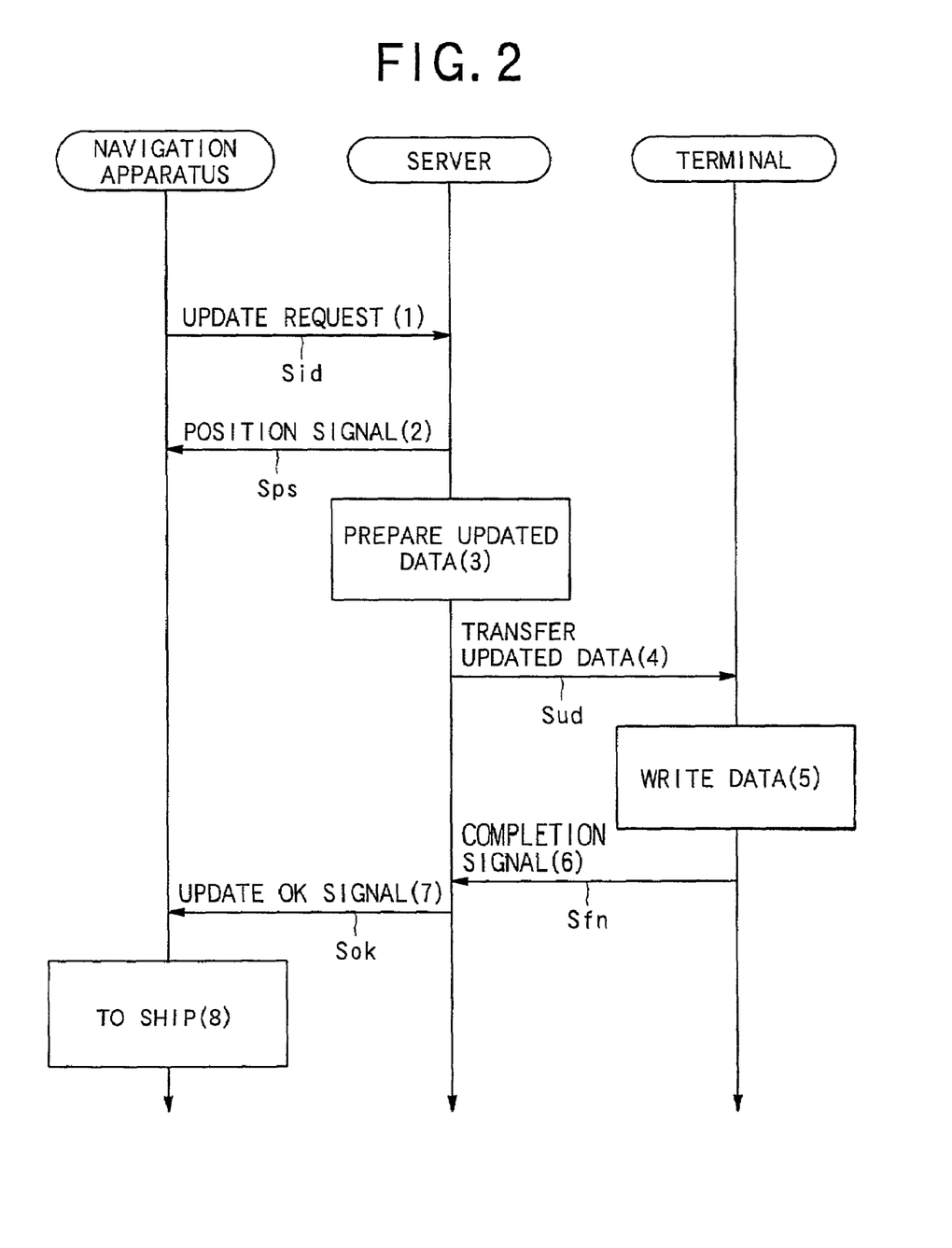
FIG. 2 is a flow diagram showing an updating process according to the first embodiment.
Figure 3:
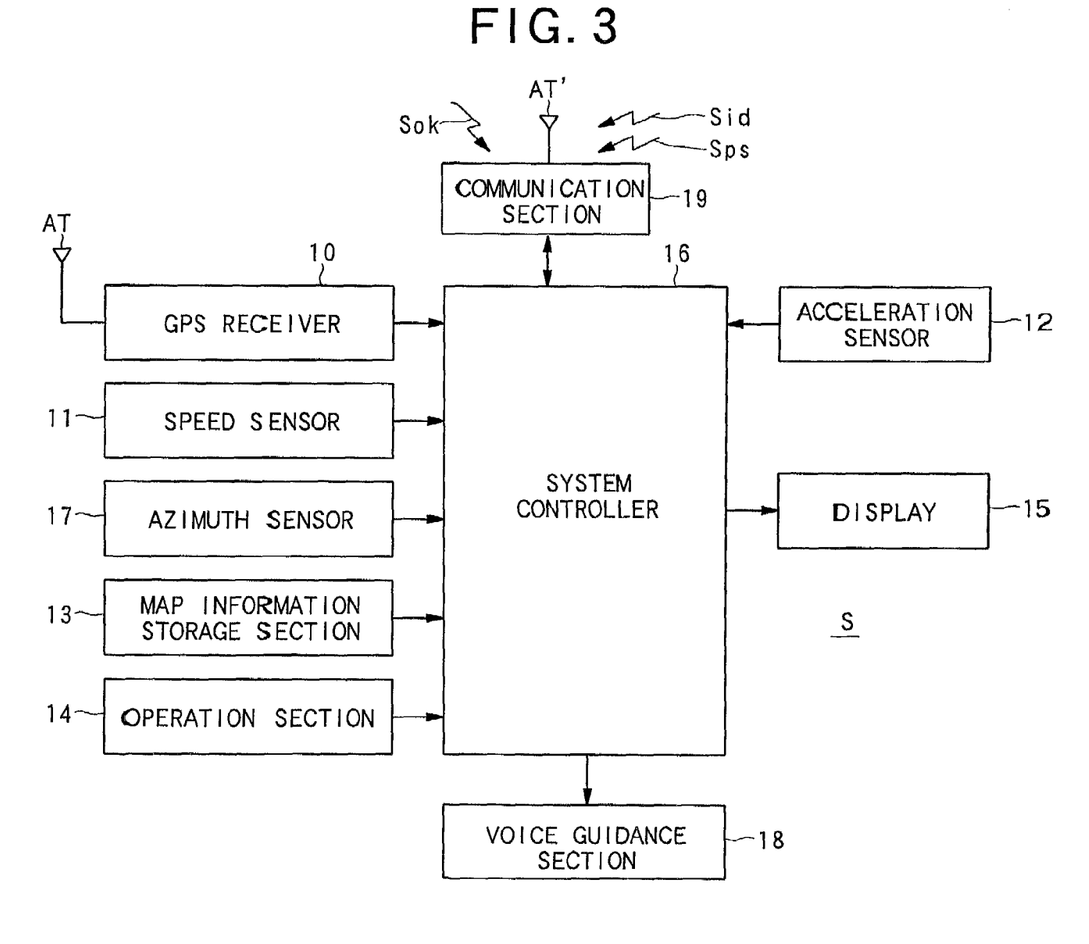
FIG. 3 is a block diagram showing a details configuration of a navigation apparatus according to the first embodiment.
Figure 4:
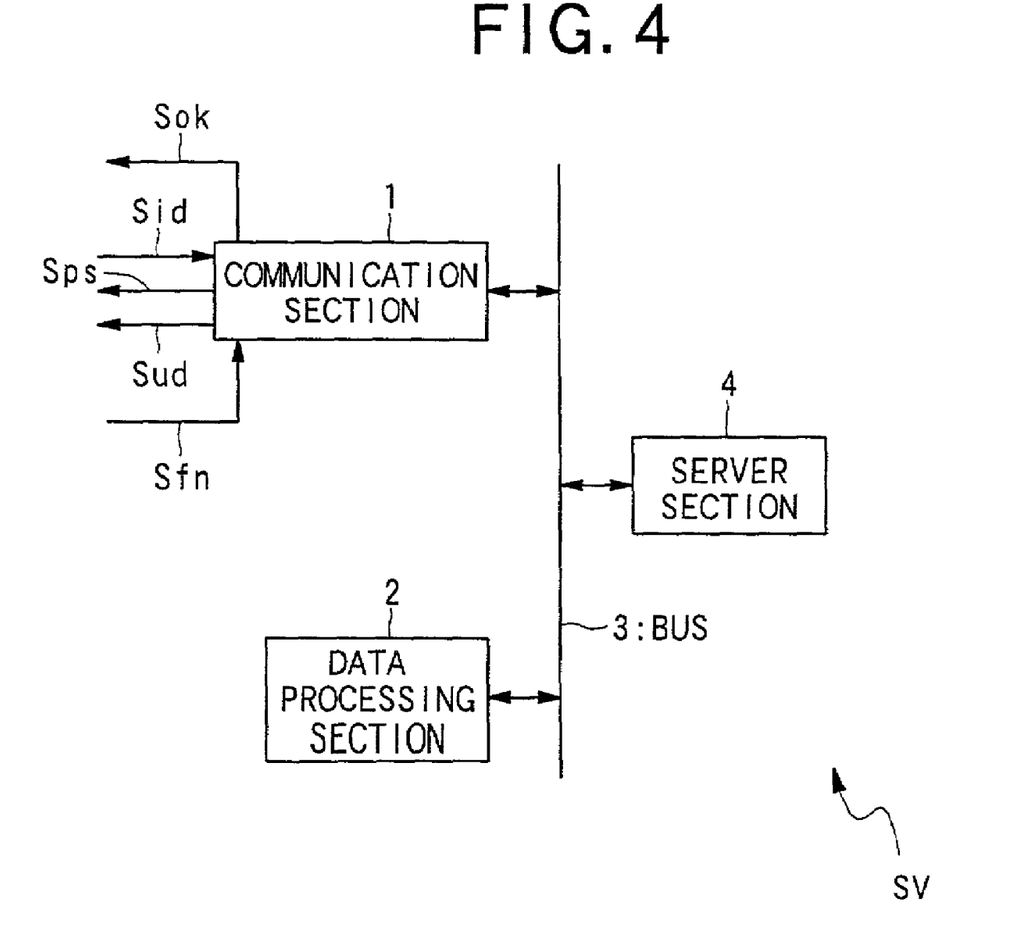
FIG. 4 is a block diagram showing a details configuration of a server according to the first embodiment.
Figure 5:
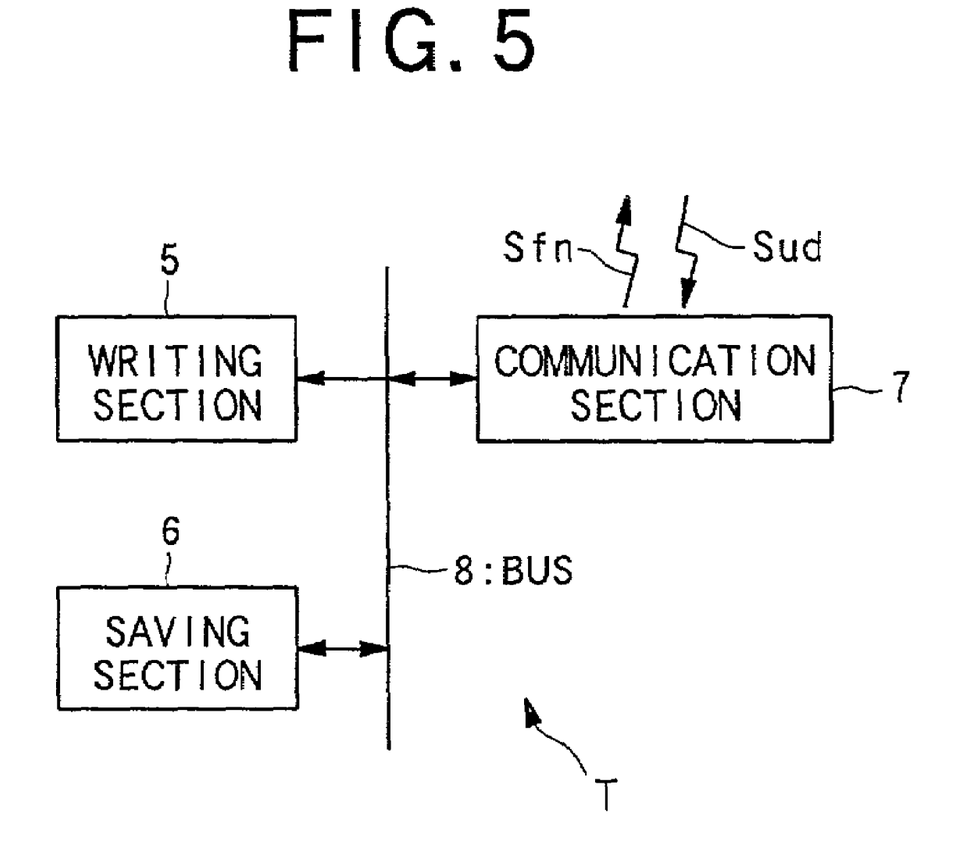
FIG. 5 is a block diagram showing a details configuration a terminal according to the first embodiment.

The first embodiment will be described with reference to FIGS. 1 to 5, in which FIG. 1 is a block diagram showing an overview configuration of a navigation information updating system, FIG. 2 illustrates an updating process, and FIGS. 3 to 5 show the detailed configurations of the components of the navigation information updating system.

As shown in FIG. 1, the navigation information updating system G according to the first embodiment comprises a navigation apparatus S on board a vehicle C, a server SV as an updating center module installed in an updating center UC, and a terminal T installed in a shop SP as a the delivery base.

The terminal T is authenticated (i.e., authorized) by the updating center UC as an authorized terminal.

Referring now to FIGS. 1 and 2, the overall operation of the system G will be described.

It should be noted that in the following description of the first and second embodiments, the term "navigation information" contains information including map information, road information, intersection information, and landmark information, for navigation process, as well as additional information (described below) which is prepared by a user before updating the navigation information, such as position information about frequently visited points, routing information to such frequently visited points, switching information indicative of the switching timing of a signal installed along frequently passing roads, history information indicative of navigation information updated records, preference information reflecting preferences shown by the user of the navigation apparatus S, and music information which the user wishes to hear (and which has nothing to do with the navigation process),etc.

Also, in the following description of the first and second embodiments, the term "updating" contains updating the map information or the road information as new roads have been constructed, as well as customizing display modes for screens displayed in the navigation process.

To update the navigation information stored in a map information storage section (described below) incorporated in the navigation apparatus S, an updating process starts with a step in which the navigation apparatus S transmits an update request Sid to the server SV (step (1)).

The update request Sid is transmitted via conventional radio communication links, or via the Internet, etc.

The update request Sid contains an identifier for uniquely identifying the navigation apparatus S from other navigation apparatuses (the identifier is also set in the navigation apparatus S as a key for permitting information to be written to or read to a hard disc within the map information storage section (described below) within the navigation system S), the history and preference information as the above-mentioned additional information as to the navigation information, and the current position of the vehicle C. Moreover, if the navigation apparatus S requests to add information about a road, the update request Sid contains the longitude/latitude data about the points of origin and termination, width, etc. of that road. If the navigation apparatus S requests to customize a display mode, the update request Sid contains information about the version of the navigation information before customization, or information about landmarks which the user of the navigation apparatus S wishes to display (e.g., as to the gas station, only the locations of gas stations belonging to Company A; as to the dealer, only the locations of dealers belonging to Company B; or as to the bank, only the locations of offices belonging to Bank C). If the navigation apparatus S requests to update the whole navigation information, the update request Sid contains information about the version of the current navigation information and information about the version to which the current navigation information is to be updated.

The update request signal Sid may be transmitted, for example, when the user wishes to update the navigation information, or when the user operates an update button or the like provided on an operation section (described below) of the navigation apparatus S to start the updating operation.

Then, the server SV, having received the update request Sid, specifies the current position of the vehicle C on the basis of the identifier and current position information contained in the received request Sid, searches for a nearby shop SP, generates a position signal Sps indicative of the location of the searched nearby shop SP, and returns the generated signal Sps to the navigation apparatus S (step (2)).

In parallel, the server SV generates the corresponding updated navigation information on the basis of the update request Sid (step (3)), generates an updated data signal Sud, and outputs the generated signal Sud to the terminal T (step (4)).

In step (3), if the update request Sid contains information about the longitude/latitude data about the points of origin and termination, width, etc. of a road, the server SV adds that road to the existing road information by overwriting, to generate the updated data signal Sud. If the navigation apparatus S requests to customize a display mode, the server SV rewrites the search information, etc. to include a landmark or landmarks which the user wishes to display, to generate the updated data signal Sud. Likewise, if the navigation apparatus S requests to update the whole information, the server SV adds a new version to the current navigation information to generate the updated data signal Sud.

Upon reception of the generated updated data signal Sud, the terminal T temporarily writes the updated data signal Sud to a saving section (described below) incorporated therein (step (5)), and, upon completion of the writing, generates a completion signal Sfn, and returns the generated signal Sfn to the server SV (step (6)).

In response to the completion signal Sfn, the server SV then generates an update OK signal Sok containing the name, etc. of the shop SP where the updated data signal Sud has been written, along with the contents of the completion signal Sfn, and returns the update OK signal Sok to the navigation apparatus S (step (7)).

Upon reception of the update OK signal Sok, the vehicle C carrying the navigation apparatus S thereon moves to the shop SP where the terminal T having the updated data signal Sud written thereto is located, on the basis of the position signal Sps acquired in step (2) (step (8)), and the navigation apparatus S thus receives the updated data signal Sud at that shop SP.

The navigation apparatus S can receive the updated data signal Sud by using the updated navigation information contained in the signal Sud to rewrite the existing navigation information in its map information storage section (described below), or by replacing its existing map information storage section with a recording medium to which the updated data signal Sud has been written as will be described below.

Referring now to FIGS. 3 to 5, the detailed configurations of the components for performing the above-mentioned updating process will be described.

As shown in FIG. 3, the navigation apparatus S according to the first embodiment comprises a GPS (Global Positioning System) receiver 10 coupled to an antenna AT, a speed sensor 11, an acceleration sensor 12, a map information storage section 13 as a recording medium, an operation section 14, a display section 15, a system controller 16 as determining device, an azimuth sensor 17, a voice guidance section 18, and a communication section 19 as transmitting device.

In operation, the GPS receiver 10 first receives navigation radio waves from a plurality of satellites belonging to the GPS through the antenna AT to calculate the pseudo coordinates of the current position for output to the system controller 16 as GPS data.

The speed sensor 11 detects the travel speed of the vehicle, and converts the detected speed into pulses or voltage for output to the system controller 16 as speed data.

The azimuth sensor 17, which is a gyro sensor, detects the azimuth of the vehicle, i.e., its heading direction, and converts the detected azimuth into pulses or voltage for output to the system controller 16 as azimuth data.

The acceleration sensor 12 detects movement of the vehicle in the vertical direction by comparing (the direction of) the gravitational acceleration with (the direction of) the acceleration resulting from the movement of the vehicle, and converts acceleration data indicative of the detected movement into pulses or voltage for output to the system controller 16.

The map information storage section 13 stores the navigation information so that the navigation information can be written thereto or read therefrom using the hard disc drive, etc.

The operation section 14, which can be a remote controller, etc. including various confirmation buttons and many keys such as numerical keys, is used to enter driver's instructions (e.g., to display information about the travel of the vehicle).

The display section 15 displays map information outputted from the map information storage section 13 and various statuses, etc. needed for routing guidance provided by the navigation apparatus S.

The voice guidance section 18 outputs audible routing guidance cues including information about the direction of travel of the vehicle at the next intersection and other navigation information to be given directly to the driver (e.g., congestion or closed-to-traffic information).

The communication section 19 transmits the update request signals Sid, and receives the position signals Sps and the update OK signals Sok for output to the system controller 16, under the control of the system controller 16.

In parallel with these operations, the system controller 16, which includes various input/output ports (e.g., a GPS reception port, a port for input from buttons and keys, a display control port, etc.), supervises control over the general functions to be performed by the navigation apparatus S for the above-described updating process. The controller 16 also controls the display section 15 to display the routing guidance information on a map covering the current position of the vehicle and its neighborhood on the basis of the traveling information (the vehicle position data and the vehicle speed data) obtained from a position calculating section (not shown), and the voice guidance section 18 to output the audible routing guidance cues, etc.

The position calculating section calculates a plurality of pseudo current positions of the vehicle on the basis of the vehicle's speed and azimuth data outputted from the speed sensor 11 and the azimuth sensor 17, respectively, and also calculates where on the display section 15 to display a position mark (indicative of the vehicle's current position on the map), after comparison of the pseudo coordinates corresponding to the current position outputted from the GPS receiver 10 with one of the calculated pseudo current positions. In addition, the position calculating section calculates the traveling information, such as vehicle's speeds and directions of travel at positions other than the pseudo current positions. The position calculating section may be provided either inside or outside the system controller 16.

Since the navigation apparatus S according to the first embodiment includes the acceleration sensor 12, the position calculating section uses the acceleration data obtained by the acceleration sensor 12 to calculate the pseudo current positions of the vehicle, while considering inclinations and altitude differences found in roads.

Thus, the acceleration sensor 12 made it possible to obtain accurate current positions of the vehicle when the vehicle is traveling along overhead highways, an underpass or an overpass at grade separations, etc. in which the speed sensor 11 and the azimuth sensor 17 designed for two-dimensional position detection could not do so. In addition, when the vehicle travels along a mountain path or a slope, error occurs between the actual distance traveled and the distance moved on the map if the current position of the vehicle is calculated on the basis of the data from the speed sensor 11 and the azimuth sensor 17 (because the actual distance traveled resulting from the vehicle running along the inclination is greater than the distance moved on the map which is plane). However, the position calculating section can correct such error by using the detected inclination of the path or the slope.

Referring next to FIG. 4, the server SV according to the first embodiment comprises a communication section 1, a data processing section 2, and a server section 4, which can intercommunicate with one another via a bus 3. The communication section 1 serves as location transmitting device, returning device, position information outputting device, acquiring device, and outputting device for exchanging signals including the update request signals Sid, position signals Sps, completion signals Sfn, updated data signals Sud, and update OK signals Sok between the navigation apparatus S and the terminal T. The data processing section 2 serves as generating device for actually generating updated navigation information. The server section 4 supervises control over the sections 1 and 2.

Referring then to FIG. 5, the terminal T according to the first embodiment comprises a communication section 7 that transmits the completion signals Sfn and receives the updated data signals Sud to and from the server SV, the saving section 6 that temporarily saves the received updated data signals Sud, and a writing section 5 serving as a recording module for writing the saved updated data signals Sud to the map information storage sections 13 within the navigation apparatus S that are brought into the shop. These components 5 to 7 can intercommunicate with one another via a bus 8.

The writing section 5 writes the updated data signal Sud directly to the map information storage section 13 within the navigation apparatus S that is brought into the shop, or alternatively may write the updated data signal Sud to a recording medium (not shown) that would then replace the map information storage section 13 within the navigation apparatus S having been brought into the shop.

As described above, in the process of updating the navigation information according to the first embodiment, updated navigation information is generated on the basis of an identifier uniquely associated with each navigation apparatus S, and the generated updated navigation information is delivered to the associated navigation apparatus S via a sales base SP to be used by the navigation apparatus S, whereby the navigation information can be updated for and then delivered to each associated navigation apparatus S while used by the associated navigation apparatus S.

Further, updated navigation information can be generated without loss of the additional information which has been generated during navigation process being executed so far, whereby navigation information can be generated which is beneficial to future execution of the navigation process.

Still further, when a map information storage section having updated navigation information recorded therein is shipped from the sales base SP, the updated navigation information can be delivered reliably and quickly.

Still further, when the recording medium having the updated navigation information recorded thereon is incorporated into the navigation apparatus S that is brought into a nearby sales base SP, the navigation information can be updated inexpensively and quickly.

Still further, the terminal T installed in the sales base SP is authenticated by the updating center UC as an authorized terminal, whereby the navigation information can be updated, while preventing illegal acts such as illegal copying at the sales base SP.

Still further, history information and preference information are used to generate the updated navigation information, whereby the updated navigation information can be generated without loss of such history and preference information as necessary for executing the navigation process in the future, and hence navigation information can be generated which is beneficial to future execution of the navigation process.

Still further, each navigation apparatus S transmits, along with its identifier, the history information and preference information generated during actual execution of the navigation process, to the updating center UC, and such transmitted history and preference information is used to generate the updated navigation information, whereby more useful updated navigation information can be generated.

Second Embodiment

Figure 6:
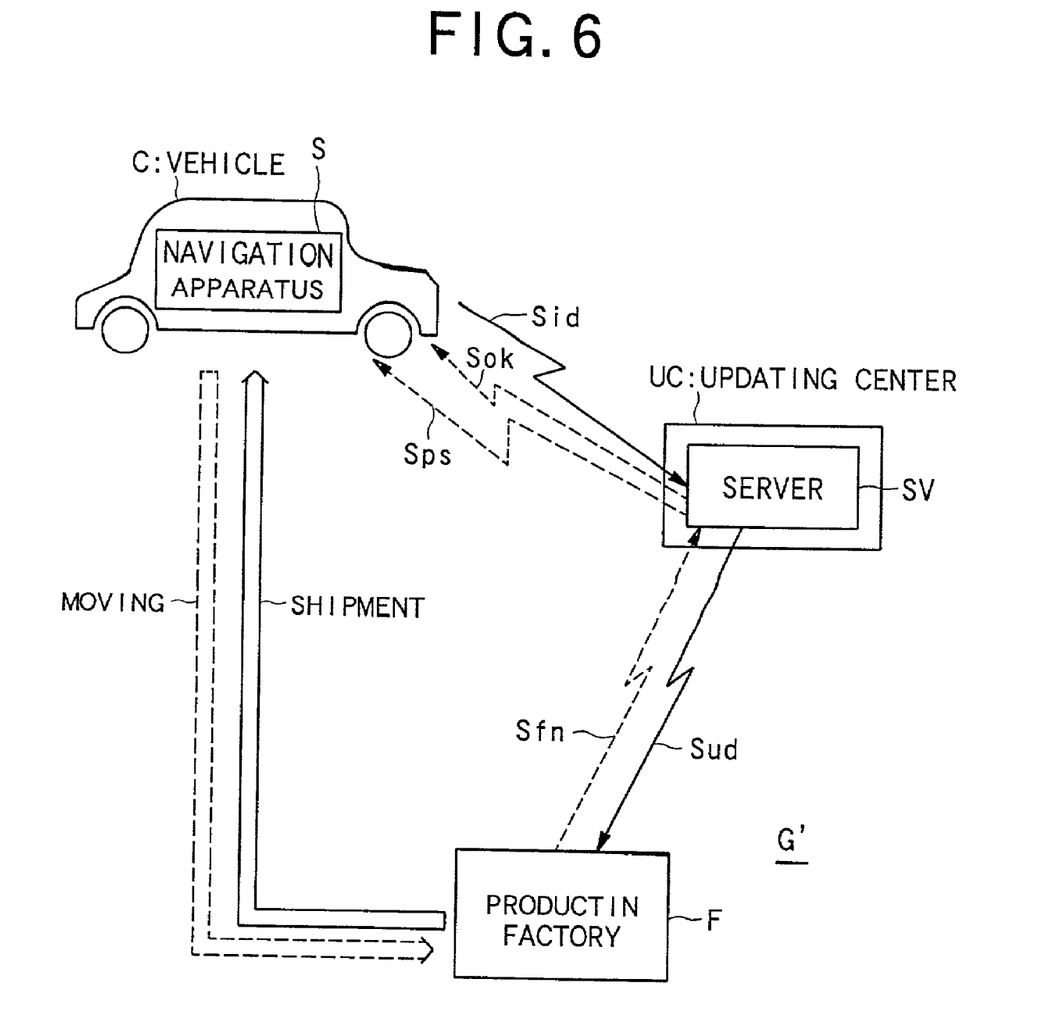
FIG. 6 is a block diagram showing an overview configuration of a navigation information updating system according to a second embodiment of the invention.
Figure 7:
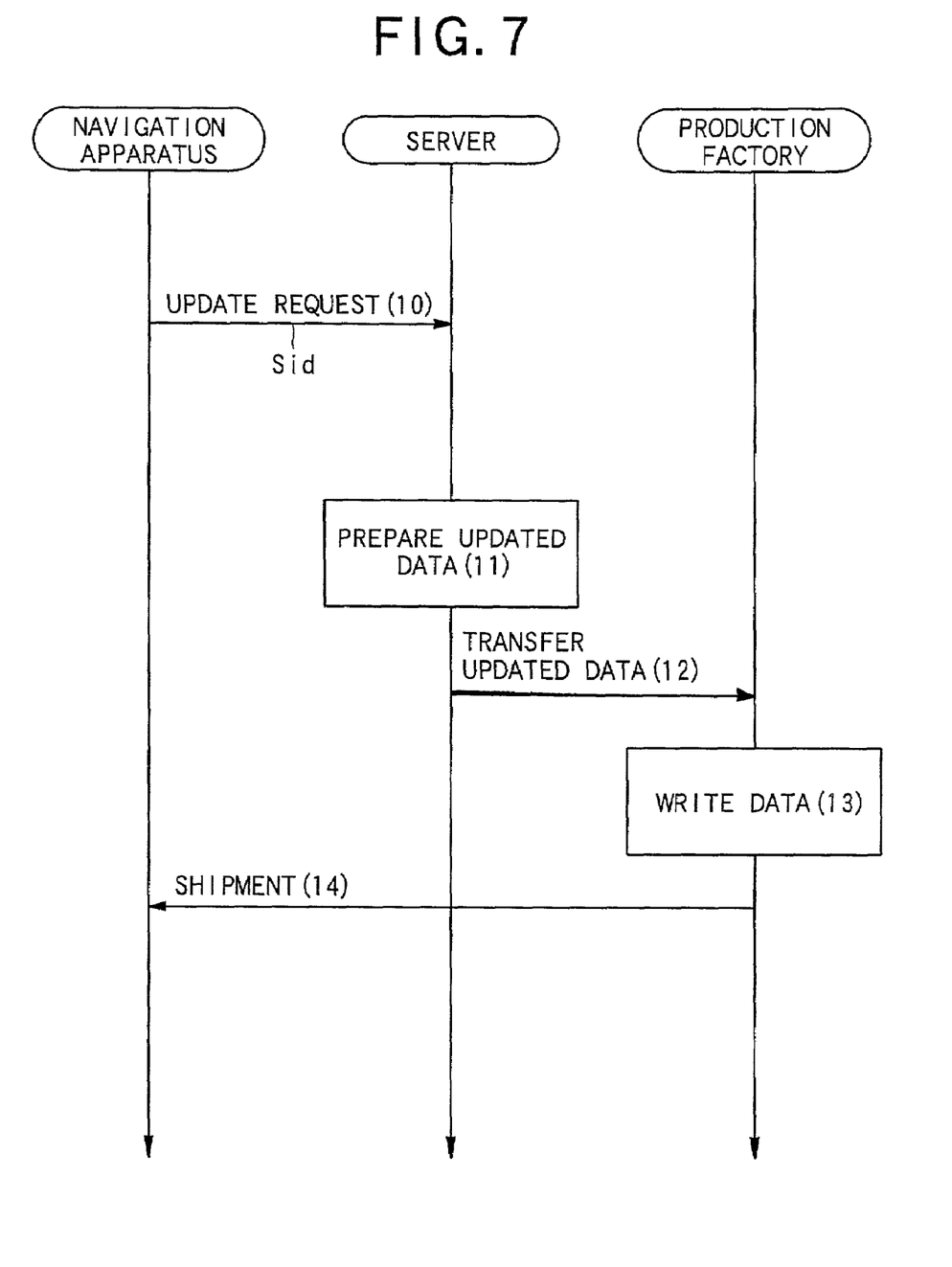
FIG. 7 is a flow diagram showing an updating process according to the second embodiment.
Figure 8:
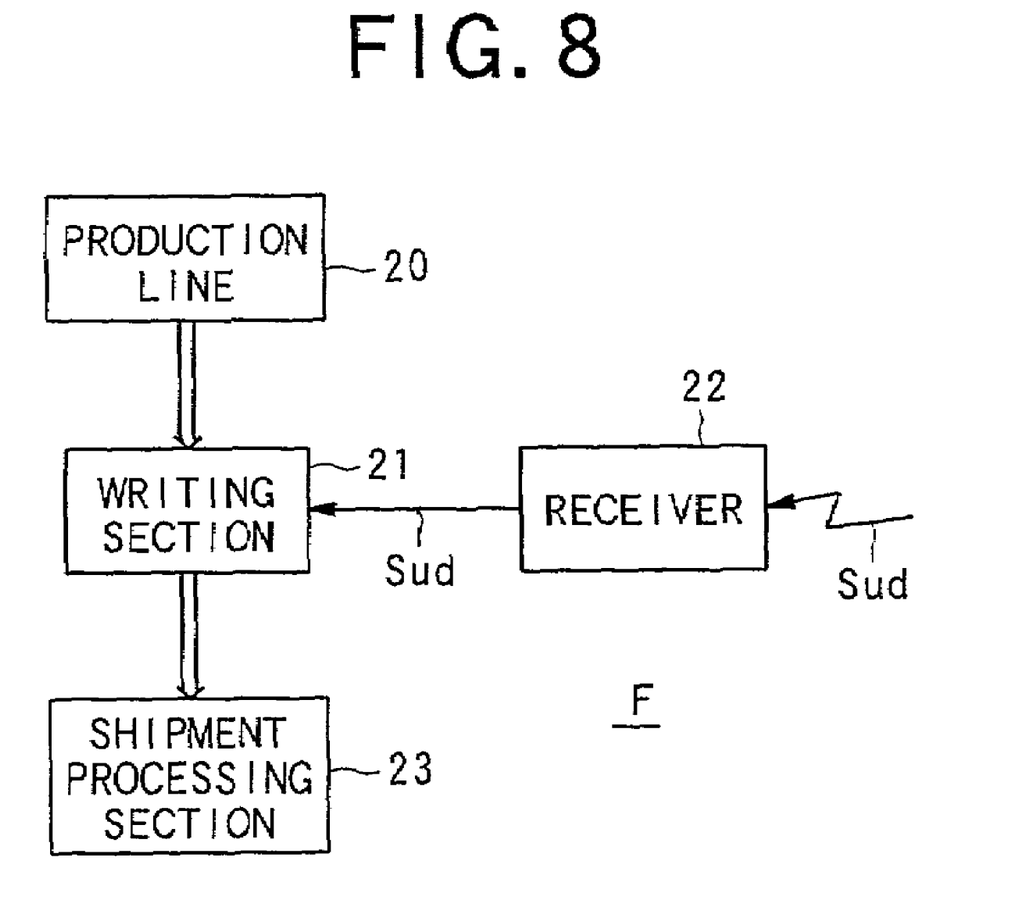
FIG. 8 is a block diagram showing a details configuration of a production factory according to the second embodiment.

The second embodiment will be described with reference to FIGS. 6 to 8, in which FIG. 6 is a block diagram showing an overview configuration of a navigation information updating system, FIG. 7 illustrates an updating process, and FIG. 8 shows the detailed configuration of a component of the navigation information updating system.

While the first embodiment refers to the case where the navigation information is updated through the terminal T located at a shop SP, the second embodiment refers to the case where the navigation information is updated through a production factory producing map information storage sections 13.

In each figure showing the second embodiment, components similar to those in the navigation information updating system G according to the first embodiment are denoted by similar reference symbols and their detailed description is omitted.

Referring now to FIG. 6, a navigation information updating system G' according to the second embodiment comprises a navigation apparatus S similar to the navigation apparatus S in the first embodiment, which is on board a vehicle C, a server SV similar to the server SV in the first embodiment, which is installed in the updating center UC, and a production factory F.

Referring next to FIGS. 6 and 7, the overall operation of the system G' will be described.

To update the navigation information stored in the map information storage section 13 in the navigation apparatus S, an updating process starts with a step in which the navigation apparatus S transmits an update request Sid to the server SV, similarly to the first embodiment (step (10)).

The server SV, having received the update request Sid, generates the corresponding updated navigation information on the basis of the received request Sid, similarly to the first embodiment (step (11)), then generates an updated data signal Sud and outputs the generated signal Sud to the production factory F (step (12)).

At the production factory F, a new map information storage section containing the outputted updated data signal Sud is produced for the navigation apparatus S (step (13)), and the produced map information storage section is then shipped to the user of the navigation apparatus S (step (14)).

The user, having received the new map information storage section, then replaces the existing map information storage section 13 incorporated in his navigation apparatus S with the new one, whereby the updating of the navigation information is completed.

Referring next to FIG. 8, the detailed configuration of the production factory F for executing the above-mentioned updating process will be described.

As shown in the figure, the production factory F according to the second embodiment comprises a receiver 22 that receives the updated data signals Sud from the server SV for output to a writing section 21, a production line 20 that produces new map information storage sections, the writing section 21 that writes the updated data signals Sud to the produced map information storage sections, and a shipment processing section 23 that ships the new map information storage sections to which the updated data signals Sud are written.

As described above, in the process of updating the navigation information according to the second embodiment, updated navigation information is generated on the basis of an identifier uniquely associated with each navigation apparatus S, and the generated updated navigation information is delivered to the associated navigation apparatus S via a production factory F to be used by the navigation apparatus S, whereby the navigation information can be updated for and then delivered to each associated navigation apparatus S while used by the associated navigation apparatus S.

Still further, updated navigation information can be generated without loss of the additional information which has been generated during navigation process being executed so far, whereby navigation information can be generated which is beneficial to future execution of the navigation process.

Still further, a map information storage section having updated navigation information recorded therein is shipped from the production factory F, whereby the updated navigation information can be delivered reliably and quickly.

Still further, history information and preference information are used to generate updated navigation information, whereby the updated navigation information can be generated without loss of such history and preference information as necessary for executing the navigation process in the future, and hence navigation information can be generated which is beneficial to future execution of the navigation process.

Still further, each navigation apparatus S transmits, along with its identifier, the history information and preference information generated during actual execution of the navigation process, to the updating center UC, and such transmitted history and preference information is used to generate the updated navigation information, whereby more useful updated navigation information can be generated.

As an alternative to the above-described second embodiment in which a newly produced map information storage section is directly shipped from the production factory F, the newly produced map information storage section may be shipped by following the steps in which: the server SV returns a position signal Sps indicative of the location of the production factory F, to the navigation apparatus S upon reception of an update request Sid; the production factory F returns a completion signal Sfn to the server SV upon completion of the production of the map information storage section; the navigation apparatus S receives an update OK signal Sok from the server SV which has received the signal Sfn; and the navigation apparatus S itself is thereafter brought into the production factory F to have the newly produced map information storage section incorporated thereinto, similarly to the first embodiment.

While the series of steps of updating the navigation information starts upon transmission of an update request Sid from the navigation apparatus S in the above embodiments, in other embodiments, the user wishing to update the navigation information may transmit a number unique to the navigation apparatus (e.g., a number recorded on the customer service card) to the server SV via telephone, fax, etc., and the server SV having received the number extracts a unique identifier associated with the navigation apparatus from the acquired number, whereby the server SV generates updated navigation information for delivery to the associated user.

To extract the identifier from the acquired number, the server SV may perform an operation preset for the acquired number, for example.

In the aforementioned embodiment, the present invention is described in the case of applying to a navigation apparatus for vehicles. But the present invention can be applied not only to a navigation apparatus for vehicles but also a cellular phone or a cellular terminal which can work as a navigation apparatus. That is to say, the present invention can be applied to a vehicle navigation system which has a present position detecting device for detecting its position, and to a navigation system for the aforementioned cellular phone or the aforementioned cellular terminal. In addition, the present invention can be applied to a navigation system that the base station detects the present position of the navigation apparatus, and that the aforementioned navigation apparatus receives the results from the base station.

The entire disclosure of Japanese Patent Application No. 2000-402108 filed on Dec. 28, 2000 including the specification, claims, drawings and summary is incorporated herein by reference in its entirety.

The invention may be embodied on other specific forms without departing from the spirit or essential characteristics thereof. The present embodiments therefore to be considered in all respects as illustrative and not restrictive, the scope of the invention being indicated by the appended claims rather than by the foregoing description and all changes which come within the meaning an range of equivalency of the claims are therefore intended to embraced therein.

What is claimed is:

1. A system for updating navigation information for navigation process executed by a navigation apparatus that assists in moving a mobile unit comprising:
   the navigation apparatus, having an identifier uniquely associated therewith and provided with a transmitting device for transmitting the identifier to an updating center module;
   the updating center module for generating updated navigation information corresponding to the navigation apparatus on the basis of the transmitted identifier to output the generated updated navigation information to a delivery terminal; and
   the delivery terminal, which is separate and distinct from the mobile unit, for delivering the outputted updated navigation information into the navigation apparatus;
   wherein the updating center module generates the updated navigation information using at least one of history information indicative of a history of the navigation process executed by the navigation apparatus and preference information indicative of preferences shown by the navigation apparatus during execution of the navigation process.

2. The system according to claim 1, wherein the navigation information is recorded on a rewritable recording medium.

3. The system according to claim 2, wherein the recording medium is associated with preset authenticating information, and
   wherein the navigation apparatus further comprises a determining device for determining whether the identifier coincides with the authenticating information, and only when the determining device determines that the identifier coincides with the authenticating information, the navigation information recorded on the recording medium can be read.

4. The system according to claim 3, wherein when generating the updated navigation information corresponding to the navigation apparatus on the basis of transmitted identifier, the updating center module associates the identifier with the updated navigation information as the authenticating information.

5. The system according to claim 2, wherein the transmitting device further transmits an additional information additionally recorded on the recording medium based on an instruction given by a user, and
wherein the updating center module generates the updated navigation information on the basis of the identifier and transmitted additional information.

6. The system according to claim 1, wherein the navigation apparatus transmits at least one of the history information and the preference information to the updating center module along with the identifier by the transmitting device.

7. A system for updating navigation information for navigation process executed by a navigation apparatus that assists in moving a mobile unit comprising:
the navigation apparatus, having an identifier uniquely associated therewith and provided with a transmitting device for transmitting the identifier to an updating center module;
the updating center module for generating updated navigation information corresponding to the navigation apparatus on the basis of transmitted identifier to output the generated updated navigation information to a delivery terminal; and
the delivery terminal, which is separate and distinct from the mobile unit, for delivering the outputted updated navigation information to the navigation apparatus;
wherein the delivery terminal is located in a production facility for producing the recording medium, the production facility comprising:
a recording module for recording the outputted updated navigation information on the recording medium; and
a shipping module for shipping the recording medium having the updated navigation information recorded thereon to a user of the navigation apparatus within which the updated navigation information is used.

8. A system for updating navigation information for navigation process executed by a navigation apparatus that assists in moving a mobile unit comprising:
the navigation apparatus, having an identifier uniquely associated therewith and provided with a transmitting device for transmitting the identifier to an updating center module;
the updating center module for generating updated navigation information corresponding to the navigation apparatus on the basis of transmitted identifier to output the generated updated navigation information to a delivery terminal; and
the delivery terminal, which is separate and distinct from the mobile unit, for delivering the outputted updated navigation information to the navigation apparatus;
wherein the delivery terminal is located in a production facility for producing the recording medium,
the production facility comprising:
a recording module for recording the outputted updated navigation information on the recording medium;
an incorporating module for incorporating the recording medium having the updated navigation information recorded thereon into the navigation apparatus which is brought into the production facility; and
wherein the updating center module further comprises a location transmitting device for transmitting location information about the delivery terminal to the navigation apparatus so that the navigation apparatus can be brought into the production facility.

9. A system for updating navigation information for navigation process executed by a navigation apparatus that assists in moving a mobile unit comprising:
the navigation apparatus, having an identifier uniquely associated therewith and provided with a transmitting device for transmitting the identifier to an updating center module;
the updating center module for generating updated navigation information corresponding to the navigation apparatus on the basis of transmitted identifier to output the generated updated navigation information to a delivery terminal; and
the delivery terminal, which is separate and distinct from the mobile unit, for delivering the outputted updated navigation information to the navigation apparatus;
wherein the delivery terminal is located in a sales facility comprising:
a recording module for recording the outputted updated navigation information on the recording medium; and
a shipping module for shipping the recording medium having the updated navigation information recorded thereon to a user of the navigation apparatus within which the updated navigation information is used.

10. A system for updating navigation information for navigation process executed by a navigation apparatus that assists in moving a mobile unit comprising:
the navigation apparatus, having an identifier uniquely associated therewith and provided with a transmitting device for transmitting the identifier to an updating center module;
the navigation apparatus, having an identifier uniquely associated therewith and provided with a transmitting device for transmitting the identifier to an updating center module;
the updating center module for generating updated navigation information corresponding to the navigation apparatus on the basis of transmitted identifier to output the generated updated navigation information to a delivery terminal; and
the delivery terminal, which is separate and distinct from the mobile unit, for delivering the outputted updated navigation information to the navigation apparatus;
wherein the transmitting device transmits a location of the navigation apparatus to the updating center module; and the updating center module further comprises:
a returning device for returning an instruction information indicative of the delivery terminal which is close to the location of the navigation apparatus on the basis of the transmitted location, to the navigation apparatus, in order to bring the navigation apparatus into the delivery terminal which is close to the location of the navigation apparatus; and
an outputting device for outputting the generated updated navigation information to the delivery terminal which is close to the location of the associated navigation apparatus; and
the delivery terminal is located in a sales facility for selling the recording medium, the sales facility comprising:
a recording module for recording the outputted updated navigation information on the recording medium; and
an incorporating module for incorporating the recording medium having the updated navigation information recorded thereon into the navigation apparatus which is brought into the sales facility.

11. The system according to claim 9, wherein the recording module is authenticated by the updating center module as an authorized recording module.

12. An apparatus for distributing updated navigation information which is obtained by updating navigation information for navigation process executed by a navigation apparatus that assists in moving a mobile unit comprising:
- an acquiring device for acquiring an identifier uniquely associated with the navigation apparatus from the navigation apparatus;
- a generating device for generating the updated navigation information corresponding to the navigation apparatus on the basis of the acquired identifier; and
- an outputting device for outputting the updated navigation information to a delivery terminal, which is separate and distinct from the mobile unit, for delivering the generated updated navigation information into the navigation apparatus;
- wherein the generating device generates the updated navigation information using at least one of history information indicative of a history of the navigation process executed by the navigation apparatus and preference information indicative of preferences shown by the navigation apparatus during execution of the navigation process.

13. The apparatus according to claim 12, wherein the generating device changes contents of the updated navigation information so as to correspond to contents of the acquired identifier, to generate the updated navigation information.

14. The apparatus according to claim 12, wherein the generating device associates the acquired identifier with the updated navigation information to generate the updated navigation information.

15. The apparatus according to claim 12, further comprising:
- a location information outputting device for outputting information about a location of the delivery terminal to the associated navigation apparatus.

16. A system for updating navigation information for navigation processes that assists in moving a mobile unit comprising:
- a navigation apparatus, having an identifier uniquely associated therewith and provided with a transmitting device for transmitting the identifier to an updating center module, the identifier including information about a version of the navigation information;
- the updating center module for generating updated navigation information corresponding to the navigation apparatus on the basis of the information about the version included in the transmitted identifier and outputting the generated updated navigation information to a delivery terminal; and
- the delivery terminal, which is separate and distinct from the mobile unit, for delivering the outputted updated navigation information into the navigation apparatus;
- wherein the updating center module generates the updated navigation information using at least one of history information indicative of a history of the navigation process executed by the navigation apparatus and preference information indicative of preferences shown by the navigation apparatus during execution of the navigation process.

17. An apparatus for distributing updated navigation information obtained by updating navigation information for navigation processes executed by a navigation apparatus that assists in moving a mobile unit comprising:
- an acquiring device for acquiring an identifier uniquely associated with the navigation apparatus, the identifier including information about a version of the navigation information;
- a generating device for generating the updated navigation information corresponding to the navigation apparatus on the basis of the information about the version included in the acquired identifier; and
- an outputting device for outputting the updated navigation information to a delivery terminal, which is separate and distinct from the mobile unit, for the generated updated navigation information into the navigation apparatus;
- wherein the generating device generates the updated navigation information using at least one of history information indicative of a history of the navigation process executed by the navigation apparatus and preference information indicative of preferences shown by the navigation apparatus during execution of the navigation process.

* * * * *